(12) United States Patent
Wakahara et al.

(10) Patent No.: US 8,754,950 B2
(45) Date of Patent: *Jun. 17, 2014

(54) DRIVING DEVICE AND IMAGING DEVICE

(75) Inventors: Junya Wakahara, Kyoto (JP); Shigeru Wada, Kishiwada (JP); Nobuya Miki, Ibaraki (JP); Atsuhiro Noda, Ashiya (JP)

(73) Assignee: Konica Minolta Opto, Inc, Tokyo (JP)

( * ) Notice: Subject to any disclaimer, the term of this patent is extended or adjusted under 35 U.S.C. 154(b) by 321 days.

This patent is subject to a terminal disclaimer.

(21) Appl. No.: 13/121,075

(22) PCT Filed: Aug. 25, 2009

(86) PCT No.: PCT/JP2009/064760
§ 371 (c)(1),
(2), (4) Date: Mar. 25, 2011

(87) PCT Pub. No.: WO2010/038564
PCT Pub. Date: Apr. 8, 2010

(65) Prior Publication Data
US 2011/0176047 A1 Jul. 21, 2011

(30) Foreign Application Priority Data
Oct. 2, 2008 (JP) ................................. 2008-257210

(51) Int. Cl.
*H04N 5/228* (2006.01)
(52) U.S. Cl.
USPC ........ 348/208.11; 348/340; 359/824; 60/528; 310/307

(58) Field of Classification Search
CPC ............................ F03G 7/065; H04N 5/23287
USPC ......... 348/208.7, 208.11, 335, 340, 345, 373, 348/374; 396/55, 75, 89; 359/811, 813, 359/823, 824; 310/306, 307, 311; 60/528
See application file for complete search history.

(56) References Cited

U.S. PATENT DOCUMENTS 3,557,336 A * 1/1971 Bullough et al. ................ 219/71
(Continued)

FOREIGN PATENT DOCUMENTS

JP 2002-098911 A 4/2002
JP 2004-076882 3/2004
(Continued)

*Primary Examiner* — Paul Berardesca
(74) *Attorney, Agent, or Firm* — Cozen O'Connor

(57) ABSTRACT

Provided is a driving device having a rod-like terminal capable of stably fixing an SMA and connecting a conductive member without preventing the size of the driving device from being reduced and affecting the performance of the SMA. Also provided is an imaging device. The driving device is equipped with a string-shaped shape-memory alloy as a driving source and includes: a base member serving as the base of the driving device; and the rod-like terminal made of a metal penetrating the base member and secured to the base member. One end side of the rod-like terminal is caulked to interpose and hold the shape-memory alloy, and the other end side of the rod-like terminal has a crimp portion where the conductive member for supplying current to the shape-memory alloy is crimped and fixed.

14 Claims, 4 Drawing Sheets

(56) References Cited

U.S. PATENT DOCUMENTS

| | | | |
|---|---|---|---|
| 7,975,477 B2 * | 7/2011 | Wakahara et al. | 60/527 |
| 8,077,411 B2 * | 12/2011 | Shyu et al. | 359/823 |
| 2006/0120708 A1 * | 6/2006 | Kosaka et al. | 396/55 |
| 2007/0137196 A1 | 6/2007 | Hamaguchi et al. | 60/527 |
| 2008/0256946 A1 * | 10/2008 | Wakahara et al. | 60/528 |
| 2009/0034094 A1 * | 2/2009 | Noda et al. | 359/694 |
| 2010/0060776 A1 * | 3/2010 | Topliss et al. | 348/340 |

FOREIGN PATENT DOCUMENTS

| | | |
|---|---|---|
| JP | 2006-189036 A | 7/2006 |
| JP | 2006-267178 | 10/2006 |
| JP | 2007-162612 A | 6/2007 |
| WO | WO 2010/038564 A1 | 4/2010 |

* cited by examiner

121

121

US 8,754,950 B2

DRIVING DEVICE AND IMAGING DEVICE

RELATED APPLICATIONS

This is a U.S. National Stage under 35 U.S.C. §371 of International Application No. PCT/JP2009/064760, filed in the Japanese Patent Office on Aug. 25, 2009, which claims priority on Japanese Patent Application No. 2008-257210, filed on Oct. 2, 2008.

FIELD OF THE INVENTION

The present invention relates to a driving device and imaging device, particularly to a driving device and imaging device having a rod-like terminal capable of connecting a shape memory alloy and conductive member.

DESCRIPTION OF RELATED ART

In recent years, attempts have been made to use an actuator of a shape memory alloy (hereinafter also referred to as "SMA") in various forms of drive apparatuses. The SMA is represented by titanium and nickel alloys. Even if the SMA is deformed at a temperature lower than the so-called transformation point, the SMA goes back to the original shape by martensite transformation when heated at a temperature higher than the transformation point. Normally, the SMA is made in the form of a string and is expanded and contracted along the length by powered heat control, whereby the SMA can be used as an actuator.

Having a wire size as fine as several tens of microns, the SMA can be used to design a compact configuration of an apparatus provided with SMA actuator. Thus, study has been made to find out the possibility to applying the SMA to various forms of equipment.

Incidentally, the aforementioned string-shaped SMA mounted on a driven member is normally supported by the base member provided on the frame or enclosure, through a fixing member that fixes both ends thereof. Further, a connection terminal for connecting a conductive member for supplying electric current to the SMA such as a lead wire or a flexible substrate is provided on the fixing member or the peripheral region thereof.

For example, in one of the techniques known in the conventional art, a SMA is interposed and held by a sandwiching section formed by bending a plate member and is crimped and fixed in position. A lead wire for supply the SMA with electric current is interposed and held between the ring-like washer member and the base member provided on the sandwiching section and is fixed using a set screw (Patent Literature 1).

In another technique known in the conventional art, the SMA together with the ball and wedge is press-fitted in the hole provided on the base member and is fixed in position. The lead wire for supply the SMA with electric current is connected by soldering to the connecting terminal provided close to the hole of the base member (Patent Literature 2).

PRIOR ARTS

Patent Literature

Patent Literature 1: Japanese Unexamined Patent Application Publication No. 2006-189036
Patent Literature 2: Japanese Unexamined Patent Application Publication No. 2002-98911

SUMMARY OF THE INVENTION

Problems to be Solved by the Invention

However, the technique disclosed in the Patent Literature 1 uses the structure of a so-called terminal strip wherein the sandwiching section for holding the interposed SMA to be crimped and fixed, and the washer member connected with the lead wire are integrated into one unit in a planar fashion. It requires a wide 2D space for this arrangement and may present difficulties in designing a compact and lightweight structure.

In the technique disclosed in Patent Literature 2, the hole of the base member to which the SMA is fixed and the connection terminal to which the lead wire is soldered are located close to each other. This may cause the performance of the SMA to be affected by thermal conduction during soldering.

The present invention is intended to solve the aforementioned problems. It is accordingly an object of this invention to provide a driving device and an imaging device, driving device having a rod-like terminal capable of stably fixing an SMA and connecting the conductive member without preventing the driving device from being designed in a compact structure or affecting the performance of the SMA.

Means for Solving the Problems

The aforementioned object of the present invention can be achieved by the invention described in any one of the following ten items.

1. A driving device provided with a string-shaped shape memory alloy as a drive source, comprising: a base member serving as a base of the driving device; and a rod-like terminal made of metal penetrating the base member and secured to the base member; wherein one end side of the rod-like terminal is caulked to interpose and hold the shape memory alloy, and the other end side of the rod-like terminal has a crimp portion where a conductive member for supplying current to the shape memory alloy is crimped and fixed.

2. The driving device described in Structure 1 wherein the rod-like terminal is a metal having a Young's modulus of not less than 50 GPa and not greater than 250 GPa.

3. The driving device described in Structure 2 wherein the rod-like terminal is made of a copper-based metal.

4. The driving device described in Structure 2 wherein the rod-like terminal is made of SUS steel.

5. The driving device described in Structure 4 wherein the rod-like terminal is heat treated.

6. The driving device described in any one of the Structures 1 through 5 wherein a side or an end face of said one end side of the rod-like terminal is provided with a caulked portion for interposing and holding the shape memory alloy.

7. The driving device described in Structure 6 wherein a V-shaped groove to be compressed by caulking is formed on the caulked portion and the shape memory alloy is held and secured by the V-shaped groove by applying pressure to an end portion of the rod-like terminal while the shape memory alloy being interposed and held on the V-shaped groove, and wherein a cut-in angle θ of the V-shaped groove is not less than 15 degrees and not greater than 45 degrees.

8. The driving device described in any one of the Structures 1 through 7 wherein a cross-section of a portion of the rod-like terminal to be compressed by caulking has a diameter smaller than that of a cross section of a portion other than the portion of the rod-like terminal to be compressed.

9. The driving device described in any one of the Structures 1 through 8 wherein the rod-like terminal has a cross section of a circular or polygonal shape.

10. An imaging device including: the driving device described in any one of the Structures 1 through 9; a lens driven by the driving device; and an image pickup element for photoelectrically converting a subject optical image guided by the lens and generating an image signal.

Advantages of the Invention

According to the present invention, one rod-like terminal is used for fixing the SMA and for connection of the conductive member for supplying the SMA with electric current, and the rod-like terminal is fixed by penetrating the base member. This arrangement allows the rod-like terminal to be arranged in a small space equivalent to the sectional area in the radial direction, and also allows the driving device to be designed in a compact structure.

Since the conductive member is connected with the rod-like terminal by crimping, not by the conventional soldering, there is no possibility of the occurrence of such a problem as deterioration of SMA performance by heat.

Crimping of the conductive member onto the rod-like terminal can be performed previously to or simultaneously with caulking of the SMA, with the result that no load is applied to the SMA.

When the caulking work is performed, the rod-like terminal is fixed in the form penetrating the base member. Thus, the end face opposite the end face used for caulking of the rod-like terminal can be received. This arrangement allows the caulking force to apply loads directly to the rod-like terminal, without using an intermediary of other members, and eliminates unstable factors in caulking work, with the result that positive securing of the SMA and stable production are ensured.

The aforementioned arrangement ensures stably fixing of the SMA and connection of the conductive member, without preventing the driving device from being designed in a compact structure or affecting the performance of the SMA.

BEST MODE FOR CARRYING OUT THE INVENTION

Figure 1A:
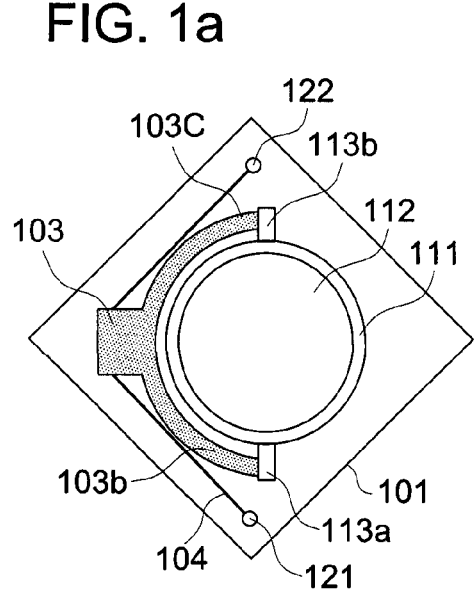
FIG. 1a, FIG. 1b, and FIG. 1c are schematic diagrams representing the approximate structure of the imaging device in an embodiment of the present invention.

Referring to the drawings, the following describes the driving device and imaging device in the embodiments of the present invention, without the present invention being restricted thereto.

Figure 1B:
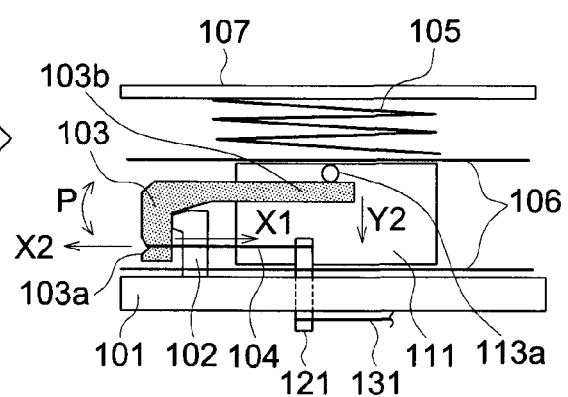
Figure 1C:
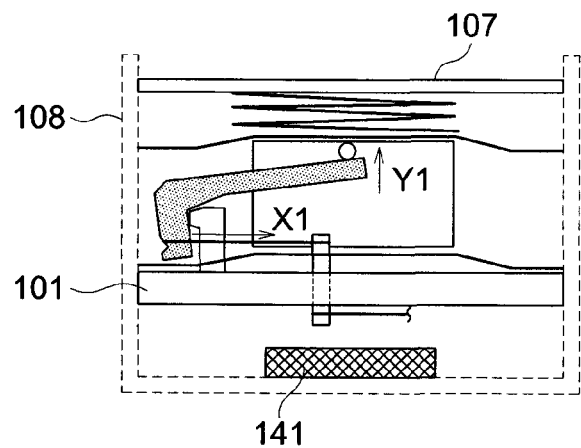

The structure of the driving device and imaging device will be described with reference to FIG. 1: FIG. 1A is a schematic plan view representing the external appearance of an imaging device 1. FIG. 1B is a schematic front view showing the same when the SMA 104 is not supplied with electric current. FIG. 1C is a schematic front view showing the same when the SMA 104 is supplied with electric current.

As illustrated in FIGS. 1A, 1B and 1C, the major portion of the imaging device 1 includes a driving device made of a base member 101, SMA 104 and SMA fixing members 121 and 122, hinge 102, drive lever 103, coil spring 105, plate spring 106, lens cone III, lens 112, conductive member 131, and image pickup element 141.

As shown in FIGS. 1A and 1B, two rod-like SMA fixing members 121 and 122 made of metal are fixed in position in the form penetrating the base member 101. It should be noted that the SMA fixing members 121 and 122 correspond to the rod-like terminals of the present invention.

Both ends of the SMA 104 are fixed on the top ends of the SMA fixing members 121 and 122 respectively by caulking. Two conductive members 131 are fixed on the lower ends respectively by caulking. In the present embodiment, caulking as an example of crimping is used to fix the conductive members 131 on the lower ends. Crimping method such as press-fitting can also be used. Details of the method of fixing the SMA 104 and the conductive member 131 by caulking will be described later.

The SMA 104 is a wire having a diameter in the order of several tens of microns, for example. As shown in FIGS. 1A and 1B, the SMA 104 is hooked on the locking section 103a of the drive lever 103, and both ends thereof are caulked and fixed onto the SMA fixing members 121 and 122 provided on the base member 101 and serving as electrodes.

A commonly used metallic thin plate, wire rod (lead wire) or flexible substrate can be used as the conductive member 131.

The drive lever 103 is rotatably supported by the hinge 102 provided on the base member 101, the hinge 102 working as a fulcrum in the direction indicated by anew P.

The lens cone 111 equipped with the lens 112 is supported by the tip ends 103b and 103c of the drive lever 103 using the abutting members 113a and 113b provided on the lens cone 111. The bottom of the lens cone 111 is provided with such an image pickup element 141 as a CCD (Charge Coupled Device) or CMOS (Complementary Metal Oxide Semiconductor) sensor of FIG. 1C that photoelectrically converts the optical image of the subject formed by the lens 112 and generates an image signal. The lens cone 111 is kept parallel by the plate springs 106 provided on the upper and lower surfaces thereof. The dotted line in FIG. 1C indicates an enclosure 108 that maintains enclosure cover 107, base member 101 and image pickup element 141 at a prescribed positional relationship (omitted in FIGS. 1A and 1B), and constitutes the imaging device 1.

The coil spring 105 has one end fixed to the enclosure cover 107, and the other end abuts to the top surface of the lens cone 111 so that the lens cone 111 is biased in the direction of arrow Y2. This allows the tension in the direction of arrow X2 to be applied to the SMA 104 through the drive lever 103. In the meantime, the SMA 104 is supplied with the stress (reference stress) serving as a desired reference in the direction of arrow X1 at the time of installation. The lens cone 111 in the non-operation mode stops where the reference stress applied to the SMA 104 is balanced with the tension applied by the coil spring 105 (stops in the initial position).

In the state of FIG. 1B, when electric current is applied to the SMA 104 from the SMA fixing member 121 to the SMA fixing member 122, the SMA 104 generates the Joule heat through its own resistance. The SMA 104 is subjected to phase transformation by the generated heat, and the elastic coefficient is increased to a relatively high level. In an attempt to go back to the memorized length (original state), the SMA 104 contracts in the direction of arrow X1. In this case, the contraction of the SMA 104 overcomes a prescribed tension given to the SMA 104 by the coil spring 105 through the drive lever 103, with the result that the lens cone 111 is driven toward the arrow Y1. FIG. 1C shows that the lens cone 111 has been driven toward the arrow Y1.

In the state of FIG. 1C, when supply of electric current to the SMA 104 is suspended, the SMA 104 undergoes phase transportation due to cooling by heat release, and the elastic coefficient is reduced to a lower level. Then a prescribed tension is applied to the SMA 104 from the coil spring 105 through the drive lever 103, and the SMA 104 is expanded. This allows the lens cone 111 to be driven toward the arrow Y2 until the state of FIG. 1B is recovered. In this manner, operations can be repeated to drive the lens cone 111 toward the arrows Y1 and Y2 through the expansion and contraction of the SMA 104.

Figure 3A:
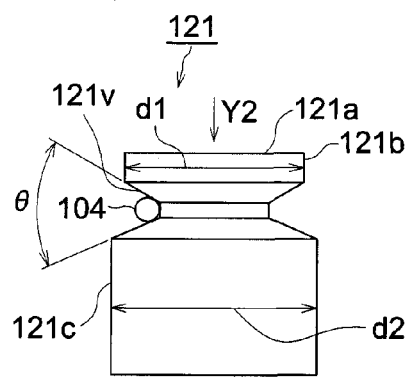
FIG. 3a, FIG. 3b, FIG. 3c, FIG. 3d, FIG. 3e, and FIG. 3f are schematic diagrams showing the shape of the caulked portion of the SMA fixing member.
Figure 3B:
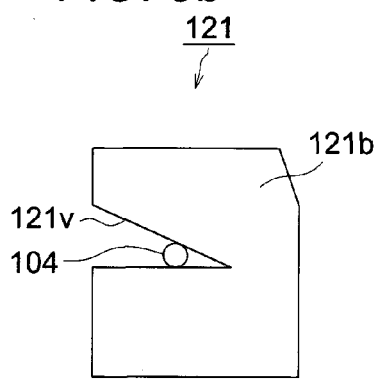
Figure 3C:
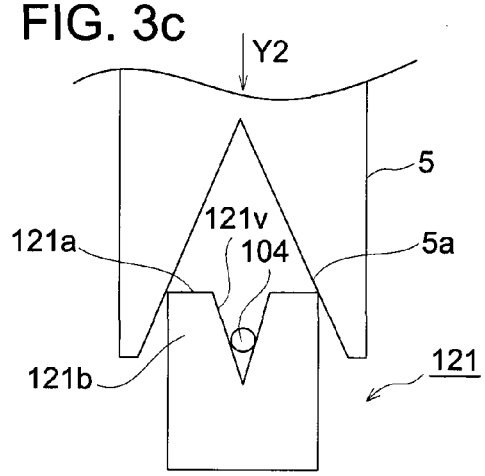
Figure 3D:
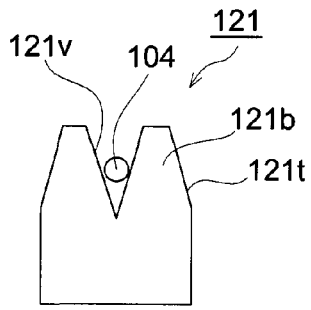
Figure 3E:
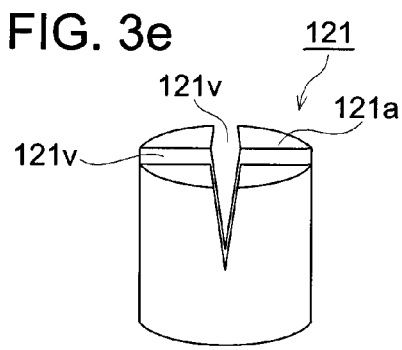
Figure 3F:
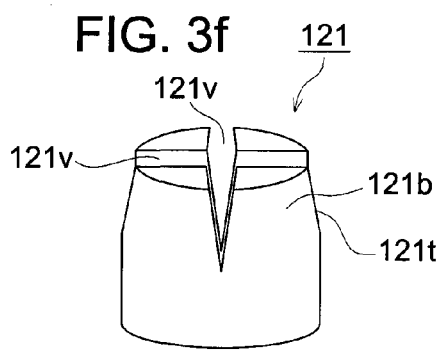
Figure 4A:
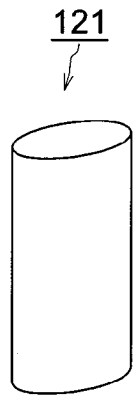
FIG. 4a and FIG. 4b are schematic diagrams showing the shape of the SMA fixing member.
Figure 4B:
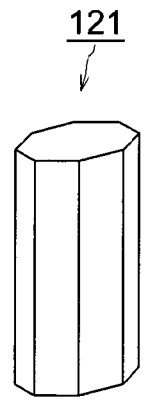

The following describes the SMA fixing members 121 and 122 with reference to FIGS. 3 and 4: Since the SMA fixing member 121 has the same configuration as the SMA fixing member 122, only the SMA fixing member 121 will be described: FIG. 3A is a schematic front view showing the shape of an example of the caulked portion of the SMA fixing member 121. FIGS. 3B through 3D are schematic front views showing the shape of another example of the caulked portion of the SMA fixing member 121. FIGS. 3E and 3F are schematic diagram from diagonally in front showing the shape of still another example of the caulked portion of the SMA fixing member 121. FIG. 4A is a schematic perspective view showing the shape of an example of the SMA fixing member 121. FIG. 4B is a schematic perspective view showing the shape of another example of the SMA fixing member 121. Each of the caulked portions of the SMA fixing member 121 is provided on each of the upper and lower ends of the SMA fixing member 121. Their shapes are the same with each other, or the shape is illustrated in any one of FIGS. 3A through 3F. Thus, only the caulked portion on the upper side is shown in FIGS. 3A through 3F, without the caulked portions (crimped portions) on the lower ends being illustrated.

As shown in FIG. 3A, the V-shaped groove 121v is formed around the lateral face of the SMA fixing member 121, and the SMA 104 is interposed and held by the groove 121v. When load is applied to the end face 121a of the SMA fixing member 121 in the direction Y2, the end face 121b as the caulked portion of the SMA fixing member 121 is subjected for deformation, and the SMA 104 is crimped and fixed (caulked). To prevent the SMA 104 from being disconnected by the non-deformed portion 121c being covered with the end face 121b deformed by caulking, the diameter d1 of the end face 121b is reduced below the diameter d2 of the non-deformed portion 121c. As will be described later, when the SMA fixing member 121 is fixed by being press-fitted into the base member 101, deformation may occur if the end face 121b of the SMA fixing member 121 is pushed. Thus, the non-deformed portion 121c is pushed for press-fitting. In this case, the diameter d1 of the end face 121b is also reduced below the diameter d2 of the non-deformed portion 121c to ensure that the end face 121b will not be caught by the press-fit hole of the base member 101.

FIG. 3B shows the shape of another example of the caulked portion. As shown in FIG. 3B, the groove 121v can be formed in the shape of a letter V on part of the lateral surface of the end face 121b of the SMA fixing member 121.

FIG. 3C shows the shape of still another example of the caulked portion. As shown in FIG. 3C, the groove 121v can be formed on the end face 121a of the SMA fixing member 121. In this case, the end face 121b of the SMA fixing member 121 is covered with the caulking jig 5 with a taper 5a formed on the inner surface shown in FIG. 3C, and pressure is applied in the direction Y2, whereby the SMA fixing member 121 is caulked. Further, as shown in FIG. 3D, a taper 121t can be formed on the end face 121b of the SMA fixing member 121. This prevents SMA fixing member 121 from being caught by the press-fit hole of the base member 101 when the SMA fixing member 121 is fixed on base member 101 by press-fitting.

FIG. 3E shows the shape of a further example of the caulked portion. As shown in FIG. 3E, the groove 121v can be formed on the end face 121a of the SMA fixing member 121 in the shape of a cross. This increases the degree of freedom in the rotational direction when the SMA fixing member 121 is press-fitted into the base member 101. As shown in FIG. 3F, a taper 121t can be formed on the end face 121b of the SMA fixing member 121. This prevents SMA fixing member 121 from being caught by the press-fit hole of the base member 101 when the SMA fixing member 121 is fixed onto the base member 101 by press fitting. It should be noted that all of the shapes shown in FIGS. 3A through 3F can be easily processed by a conventional machining method.

As shown in FIGS. 4A and 4B, the SMA fixing member 121 is formed in a cylindrical or polyangular prismatic form. When the groove 121v is around the lateral surface of the SMA fixing member 121 as shown in FIG. 3A, the SMA fixing member 121 can be fixed on the base member 101 in any direction. Thus, the SMA fixing member 121 is preferably cylindrical, as shown in FIG. 4A. In the meantime, as shown in FIG. 3B, when the groove 121v is formed in a doglegged shape on part of the lateral surface of the SMA fixing member 121, the SMA fixing member 121 must be fixed on the base member 101 in a prescribed direction. Thus, as shown in FIG. 4B, the SMA fixing member 121 is preferably formed in a polyangular prismatic shape. The SMA fixing member 121 shown in FIG. 4B is formed in an octagonal prismatic shape, without the SMA fixing member 121 being restricted to this shape. The SMA fixing member 121 can be formed in an N-angular prismatic shape (where N is a positive integer), or in a D-cut shape.

Since the SMA 104 is supported by the elastic force of the SMA fixing member 121, a great holding force is obtained at the caulked portion if the SMA fixing member 121 is made of a material having a greater Young's modulus. However, as the Young's modulus is greater, a greater force is required to deform the shape of the groove in the caulking work. This will lead to an increase in the amount of deformation of the SMA 104 due to the caulking work, and will result in an easier wire disconnection in the repeated driving operation. To solve this problem, the SUS steel or copper-based metallic material having a Young's modulus of 50 through 250 GPa is preferably used when consideration is given to the holding force and caulking pressure. The copper-based metallic material can be easily cut to get a desired shape. When the SUS steel is used, the material may be hardened by the internal stress produced in the process of machining the SMA fixing member 121. Accordingly, to reduce the internal stress, annealing or solution treatment is preferably provided.

The following describes the method of fixing the SMA fixing member 121 onto the base member 101:

The base member 101 is formed to have a prescribed thickness, because the base member 101 is required to have the strength against the load in the caulking work and the strength for stable holding the lens cone 111. The base member 101 is made of a nonconductive material to ensure that an electrically short circuit will not be established between two SMA fixing members 121 and 122 to which the conductive member 131 is fixed. When a conductive material has to be used as the material of the base member 101, insulation treatment is provided between the base member 101 and two SMA fixing members 121 and 122.

The SMA fixing member 121 can be fitted onto the base member 101 by the insert molding method wherein the SMA fixing member 121 is molded integral with the base member 101, or by the method wherein a hole for insertion of the SMA fixing member 121 is provided on the base member 101 in advance, so that the SMA fixing member 121 is fixed by press-fitting.

As shown in FIG. 3B, when the V-shaped groove 121v of the SMA fixing member 121 is directional without being axially symmetric, the direction of the groove 121v must be adjusted in conformity to the installation method of the SMA 104. In this case, it is necessary to use the SMA fixing member 121 having a directional shape as shown in FIG. 4B. The position of the groove 121v is determined in that direction. To put it more specifically, when the insert molding is used, it is necessary to provide the shape that permits the direction to be set by the mold. When the press-fitting is used, it is necessary to use the polygonal or D-cut shape capable of setting the direction of the press-fitting hole shape.

Figure 2:
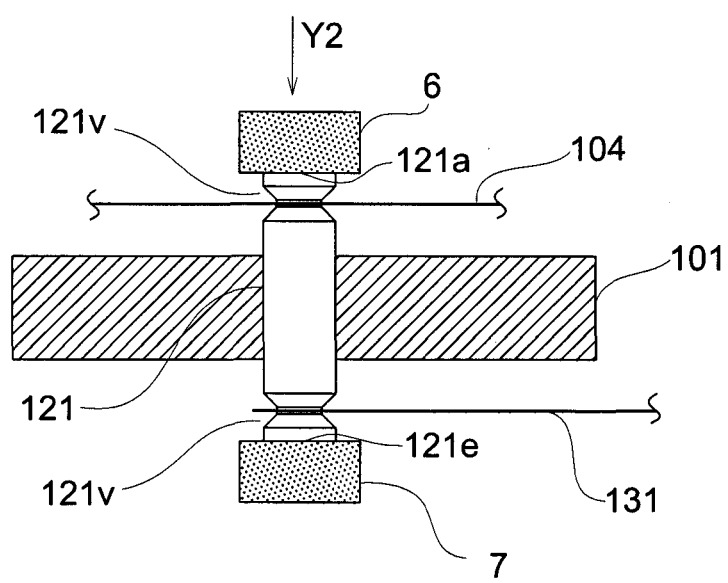
FIG. 2 is a schematic diagram representing the method of caulking the SMA fixing member, SMA and conductive member.

The following describes the caulking procedure with reference to FIGS. 1 and 2. FIG. 2 is a schematic diagram representing the method of caulking the SMA fixing member 121, SMA 104 and conductive member 131.

As shown in FIG. 1, the SMA 104 is locked with the locking section 103a of the drive lever 103, and is installed so that a prescribed tension is applied.

As shown in FIG. 2, both ends of the installed SMA 104 are abutted on the groove 121v on the upper end of the SMA fixing member 121 (122), and the conductive member 131 is abutted on the groove 121v on the lower end. The SMA fixing member 121 (122) of this configuration is placed on the holder 7. A punch 6 is used to apply pressure in the direction of arrow Y2, whereby the SMA 104 and conductive member 131 are interposed and held by the SMA fixing member 121 (122), and are fixed in position.

The conductive member 131 can be caulked and fixed in position before the SMA 104 is caulked and fixed onto the SMA fixing member 121 (122).

The SMA fixing member 121 penetrates the base member 101 and is fixed in position. Accordingly, the SMA fixing member 121 can receive the end face 121e opposite the end face 121a used to caulk the SMA fixing member 121 when the caulking work is done. This allows the caulking force to apply loads directly to the SMA fixing member 121 without using an intermediary of other members, and therefore, eliminates the unstable factor in caulking work, with the result that positive fixing of the SMA and stable production are ensured.

Referring to FIG. 3A, the following describes the cut-in angle of the V-shaped groove 121v formed on the SMA fixing member 121:

In the process of caulking the SMA fixing member 121, while the V-shaped groove 121v is deformed, the SMA 104 is sandwiched and deformed to be held and fixed in position. As shown in FIG. 3A, when the shape of the groove 121v is axially symmetric, uniform deformation along the length of the SMA 104 is achieved in the process of deformation.

To put it more specifically, when the groove 121v is V-shaped, and the cut-in angle is set within the range of 15 through 45 degrees, the uniform deformation along the length of the SMA 104 can be provided. If deformation is not uniform, a greater force will be applied where a greater amount of deformation is produced, and easy wire disconnection will be caused by repeated drive operations. Uniform deformation will increase the holding force and reliability. Further, shaping of the groove 121v in this manner reduces impact on the installation tension applied to the SMA 104 due to caulking, and provides stable installation tension and assembling precision.

The following describes the method of driving of the driving device: The SMA 104 control is performed based on the linear relationship between the resistance and deformation of the SMA 104. To put it more specifically, the amount of deformation required to move the lens cone 111 a prescribed distance can be calculated from the overall length of the SMA 104, and therefore, a step is taken to calculate the resistance corresponding to the amount of deformation of the SMA 104 required to drive the lens cone 111 to the target position. Then the drive voltage of the SMA 104 is controlled to ensure that the resistance of the SMA 104 will reach the target resistance, whereby the lens cone 111 is driven.

Figure 5:
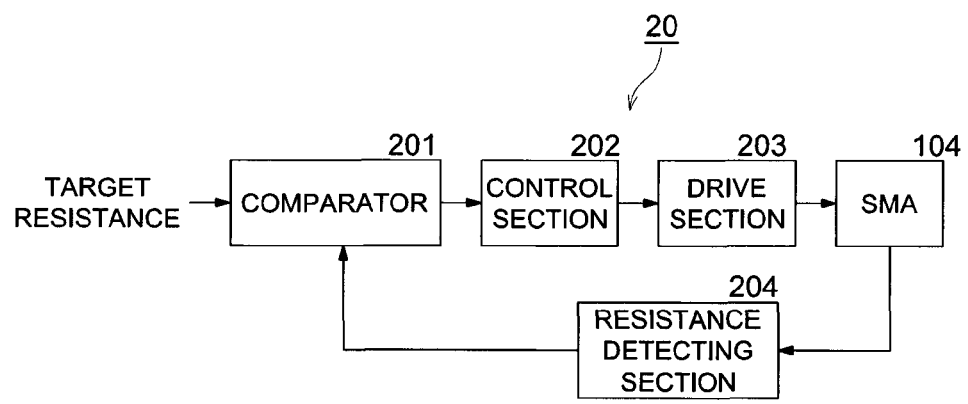
FIG. 5 is a block diagram showing the approximate structure of the control system.

FIG. 5 shows an example of the control system 20 of the driving device. As shown in FIG. 5, the control system 20 includes a comparator 201 control section 202, drive section 203 and resistance detecting section 204. The drive voltage of the SMA 104 is controlled so that the resistance of the SMA 104 is brought closer to the target resistance inputted from a camera (not illustrated), for example.

In the first place, the resistance detecting section 204 detects the resistance of the SMA 104 provided on the driving device. The comparator 201 makes comparison between the resistance of the SMA 104 detected by the resistance detecting section 204 and the target resistance of the camera, and calculates the difference. The control section 202 calculates the drive voltage of the SMA 104 in response to the difference having been calculated by the comparator 201. The drive section 203 generates the drive voltage based on the drive voltage of the SMA 104 calculated by the control section 202, and applies it to the SMA 104. The SMA 104 is deformed by the drive voltage applied from the drive section 203, whereby the lens cone 111 is driven. This operation procedure is repeated until the difference calculated by the comparator 201 is reduced to zero. This allows the lens cone 111 to be driven to the target position.

As described above, in the driving device and imaging device 1 in the embodiment of the present invention, one rod-like terminal (SMA fixing members 121 and 122) is used for fixing the SMA 104 and for connection of the conductive member 131 for supplying the SMA 104 with electric current, and the rod-like terminal is fixed by penetrating the base member. This arrangement allows the rod-like terminal to be arranged in a small space equivalent to the sectional area in the radial direction, allows the driving device and imaging device 1 to be designed in a compact structure.

Since the conductive member 131 is connected with the rod-like terminal by caulking, not by the conventional soldering, there is no possibility of the occurrence of such a problem as deterioration of SMA 104 performance by heat.

Caulking of the conductive member 131 onto the rod-like terminal can be performed previously to or simultaneously with caulking of the SMA 104, with the result that no load is applied to the SMA 104.

When the crimping or caulking work is performed, the rod-like terminal is fixed in the form penetrating the base member 101. Thus, the end face opposite the end face used for caulking of the rod-like terminal can be received. This arrangement allows the caulking force to apply loads directly to the rod-like terminal, without using an intermediary of other members, and eliminates unstable factors in caulking work, with the result that positive securing of the SMA 104 and stable production are ensured.

The aforementioned arrangement ensures stably fixing of the SMA 104 and connection of the conductive member 131, without preventing the driving device and imaging device 1 from being designed in a compact structure or affecting the performance of the SMA 104.

DESCRIPTION OF NUMERALS

1. Imaging device
101. Base member
102. Hinge
103. Drive lever
104. SMA
105. Coil spring
106. Plate spring
107. Cover
108. Enclosure
111. Lens cone
112. Lens
113a, 113b. Abutting member
121, 122. SMA fixing members (rod-like terminal)
131. Conductive member
141. Image pickup element
5. Caulking jig
6. Punch
7. Holder
20. Control system
201. Comparator
202. Control section
203. Drive section
204. Resistance detecting section

The invention claimed is:

1. A driving device provided with a string-shaped shape memory alloy as a drive source, comprising:
   a base member serving as a base of the driving device; and
   a rod-like member made of metal and secured through the base member;
   wherein one end side of the rod-like member is crimped by being compressed to interpose and hold the shape memory alloy, and the other end side of the rod-like member has a crimp portion where a conductive member for supplying current to the shape memory alloy is crimped and fixed, and
   wherein the other end side of the rod-like member has a receiving portion to receive loads when crimping work to interpose and hold the shape memory alloy is done.

2. The driving device of claim 1, wherein the rod-like member is a metal having a Young's modulus of not less than 50 GPa and not greater than 250 GPa.

3. The driving device of claim 2, wherein the rod-like member is made of a copper-based metal.

4. The driving device of claim 2, wherein the rod-like member is made of SUS steel.

5. The driving device of claim 4, wherein the rod-like member is heat treated.

6. The driving device of claim 1, wherein a side or an end face of said one end side of the rod-like member is provided with a crimped portion for interposing and holding the shape memory alloy.

7. The driving device of claim 1, wherein a tapered groove to be compressed by crimping is formed on a crimped portion for interposing and holding the shape memory alloy and the shape memory alloy is held and secured by the tapered groove by applying pressure to an end portion of the rod-like member while the shape memory alloy is being interposed and held on the tapered groove, and wherein a cut-in angle θ of the tapered groove is not less than 15 degrees and not greater than 45 degrees.

8. The driving device of claim 1, wherein a cross-section of a portion of the rod-like member to be compressed by crimping has a diameter smaller than that of a cross section of a portion other than the portion of the rod-like member to be compressed.

9. The driving device of claim 1, wherein the rod-like member has a cross section of a circular or polygonal shape.

10. An imaging device comprising:
    the driving device of claim 1;
    a lens driven by the driving device; and
    an image pickup element for photoelectrically converting a subject optical image guided by the lens and generating an image signal.

11. The driving device of claim 1, wherein the crimp portion where the conductive member for supplying current to the shape memory alloy is crimped and fixed has a receiving portion to receive loads when crimping work to interpose the conductive member is done.

12. The driving device of claim 1, wherein the shape memory alloy and the conductive member are interposed in a direction perpendicular to a direction of the rod-like member.

13. The driving device of claim 1, wherein the conductive member is fixed by crimping the rod-like member.

14. The driving device of claim 1, wherein the conductive member is fixed by press fitting against the rod-like member.

* * * * *